United States Patent
Eisele et al.

(10) Patent No.: US 8,529,400 B2
(45) Date of Patent: Sep. 10, 2013

(54) METHOD FOR COUPLING AN INTERNAL COMBUSTION ENGINE OF A PARALLEL-HYBRID DRIVE TRAIN

(75) Inventors: Markus Eisele, Friedrichshafen (DE); Michael Sauter, Rot (DE)

(73) Assignee: ZF Friedrichshafen AG, Friedrichshafen (DE)

(*) Notice: Subject to any disclaimer, the term of this patent is extended or adjusted under 35 U.S.C. 154(b) by 289 days.

(21) Appl. No.: 13/143,745

(22) PCT Filed: Jan. 29, 2010

(86) PCT No.: PCT/EP2010/051052
§ 371 (c)(1),
(2), (4) Date: Jul. 8, 2011

(87) PCT Pub. No.: WO2010/089247
PCT Pub. Date: Aug. 12, 2010

(65) Prior Publication Data
US 2011/0287889 A1 Nov. 24, 2011

(30) Foreign Application Priority Data
Feb. 9, 2009 (DE) .......................... 10 2009 000 706

(51) Int. Cl.
*B60W 20/00* (2006.01)
(52) U.S. Cl.
USPC ............................................................ 477/5
(58) Field of Classification Search
USPC ............................................ 477/5; 903/930
See application file for complete search history.

(56) References Cited

U.S. PATENT DOCUMENTS

| 6,190,282 B1* | 2/2001 | Deguchi et al. ................... 477/5 |
| 7,226,383 B2 | 6/2007 | Namba |
| 2002/0170758 A1 | 11/2002 | Shimabukuro et al. |
| 2007/0227791 A1 | 10/2007 | Ueno |
| 2008/0129049 A1 | 6/2008 | Sauvlet et al. |
| 2013/0029805 A1* | 1/2013 | Matsuo et al. ................... 477/5 |

FOREIGN PATENT DOCUMENTS

| EP | 1 526 023 A2 | 4/2005 |
| EP | 1 925 521 A2 | 5/2005 |
| EP | 1 839 986 A1 | 10/2007 |

* cited by examiner

Primary Examiner — Sherry Estremsky
(74) Attorney, Agent, or Firm — Davis & Bujold, PLLC

(57) ABSTRACT

A method of coupling a combustion engine of a parallel-hybrid drive train via a clutch positioned between the engine and an electric machine with the clutch device initially disengaged, the engine rotational speed approximately at an engine idling rotational speed, and the machine rotational speed larger than the engine idling rotation speed. When a request is made for a drive torque value which is larger than a torque threshold, the engine rotational speed is brought to a rotational speed value above the machine rotational speed and the clutch is slipping engaged once the rotational speed value is reached, while the engine, when the drive train decelerates and a request is made to couple the engine, is brought into deceleration cancellation and the engine rotational speed is brought up to the machine rotational speed while engaging the clutch and dependent on a transfer ability of the clutch.

5 Claims, 1 Drawing Sheet

METHOD FOR COUPLING AN INTERNAL COMBUSTION ENGINE OF A PARALLEL-HYBRID DRIVE TRAIN

This application is a National Stage completion of PCT/EP2010/051052 filed Jan. 29, 2010, which claims priority from German patent application serial no. 10 2009 000 706.7 filed Feb. 9, 2009.

FIELD OF THE INVENTION

The invention relates to a method for coupling an combustion engine of a parallel-hybrid-drive train.

BACKGROUND OF THE INVENTION

The parallel-hybrid drive trains as known in the art are usually constructed with a combustion engine, an electric machine, and a clutch device between the combustion engine and the electric machine. The electric machine is connected in a rotationally fixed manner with a transmission input shaft of a transmission which is positioned on the output side in reference to the electric machine, and the transmission represents different gear ratios. Thus, the rotational speed of the electric machine essentially equals the transmission input rotational speed.

During pure electric drive operation of a hybrid vehicle with a parallel-hybrid drive train, and where the clutch device between the combustion engine and the electric machine is disengaged, and the rotational speed of the electric machine is larger than an idle rotational speed of the combustion engine, and the combustion engine operates in an idle mode, the clutch device needs to be engaged for the operating dependent requirements to exist for coupling the combustion engine to the drive train, thus producing a hybrid operating mode.

If there exists a respective requirement to engage the clutch device, the rotational speed of the combustion engine is increased to the transmission input rotational speed, which is identical to the rotational speed of the electric machine, prior to engagement of the clutch device, such that the clutch device becomes synchronized. Hereby, the rotational speed of the combustion engine is rotation speed controlled, or also accelerated via a torque control in the direction of the synchronous rotational speed of the clutch device, which is engaged with little load when the synchronous condition is reached. Thereafter, the combustion engine generates the necessary load through the control of the torque of the combustion engine.

If the procedure of coupling the combustion engine, for instance, takes place during an uphill drive, which requires a large torque when in this traction mode, the combustion engine provides directly after engagement of the clutch device, as a maximum torque, a torque value which is derived from the rotational speed-torque-characteristic of the combustion engine.

Disadvantageously, the provided torque of the combustion engine, after the engagement of the clutch device at the related low rotational speed or synchronous rotational speed, respectively, of the clutch device, is not sufficient to transfer the load increase which is expected by the driver. That means that the vehicle in these operating conditions of the drive train, through the combustion engine, can at that time only be modestly accelerated. At the same time, due to the low rotational speed level from the combustion engine and a simultaneous large torque transfer of the combustion engine, it feels as though the engine will shortly stall.

A similar, disadvantageous operating condition sequence is present if the driver, during coupling of the combustion engine to the drive train, activates an accelerator pedal of the vehicle and spontaneously, for instance depending on the situation, when a significantly larger desired torque is required. At the time, in which the drive train is in the hybrid drive mode due to the synchronous engagement of the clutch device, the requested torque through the combustion engine, which is required for the conversion into the required acceleration of the vehicle, cannot be provided as spontaneously as expected.

During an operation condition sequence in which, during a deceleration mode of the parallel-hybrid drive train, a brake torque is requested from the combustion engine, the previously described, active acceleration of the combustion engine to the level of the electric machine or the transmission input rotational speed of the drive train, respectively, leads to unwanted fuel consumption by the combustion engine.

Furthermore, the request to couple the combustion engine to the drive train during an operating mode, in which a drive resistance changes significantly, is viewed as critical. That results from the fact that a vehicle, in traction mode with its parallel-hybrid-drive train and the presence of a spontaneous uphill drive, is delayed to a large extent so that coupling of the combustion engine is technically no longer appropriate and that the clutch device needs again to be disengaged, since in such a case the available traction force on the drive side is too low and a downshift in the transmission area needs to be initiated. Such an operating mode sequence creates high operating noise and leads to low drive comfort, an unwanted high disturbance, and creates stress to the parts.

SUMMARY OF THE INVENTION

Thus, the objective of the present invention is to provide a method for coupling an internal combustion engine of a parallel-hybrid drive train, through which the above mentioned disadvantages can be avoided.

In the inventive method for coupling a combustion engine of a parallel-hybrid drive train with a clutch device, which is positioned between the combustion engine and an electric machine, starting from a disengaged operating mode of the clutch device with a rotational speed of the combustion engine which is at least approximately the same as an idling rotation speed, and a rotational speed of the electric machine which is larger than the idling rotational speed of the combustion engine, during traction operation of the drive train and when a request is present to couple the combustion engine, as well as the presence of a torque value which is lower than a torque threshold, the rotational speed of the combustion engine is brought to the rotational speed of the electric machine and the clutch device is at least engaged in a synchronous operating mode and thereafter, the torque of the combustion engine is increased, and when a request is present for a drive torque value which is larger than the torque threshold, the rotational speed of the combustion engine is brought to a rotational speed value above the rotational speed of the electric machine and the clutch device is engaged under slippage when the rotational speed value has been reached, when the combustion engine is in deceleration mode of the drive train and when a request is present, the combustion engine is brought into the throttle cutoff for the coupling and the rotational speed of the combustion engine, during the engagement operation of the clutch device, is brought to the rotational speed of the electric machine dependent on the ability of the clutch device to transmit.

Combustion engines in accordance with this invention and with parallel-hybrid drive trains are operated, contrary to conventionally operated combustion engines, already at rotation speed levels, when a request is present to couple the combustion engines in traction mode and their parallel-hybrid drive trains, as well as a simultaneous request for large drive torques for the combustion engine at the end of the engagement operation of the clutch devices, whereby the combustion engines provide at least an approximate torque which is close to the requested torque. In addition, and due to the slippage operated clutch devices during the engagement process, the centrifugal masses of the rotating combustion engines can be used, meaning the static motor torques as well as the dynamic portions, to at least create an approximate drive torque in the region of the outputs.

In the deceleration mode of parallel-hybrid drive trains, by means of the method and in accordance with this invention, a desired deceleration torque can be provided to couple the combustion engine without gasoline consumption of the combustion engines, because the coupling devices bring the respective combustion engines, which are operated in deceleration mode, through a slippage operation to the rotation speed levels of the electric machines.

In an advantageous variation of the method and in accordance with the invention, when a request is present to couple the combustion engine, and when a drive torque value on the combustion engine side is larger than the torque threshold, the rotational speed of the combustion engine is controllably adjusted.

As an alternative, the drive torque of the combustion engine, when a request is present to couple the combustion engine and with a drive torque value on the combustion engine side which is larger than the torque threshold, can be limited to a pre-defined torque value during the increase of the rotation speed, to avoid an undefined increase of the rotational speed of the combustion engine with little effort in adjustment and control.

Activation of the clutch device can be varied, like during a change of the request for drive torque on the combustion engine side and/or during a change between a traction mode and a deceleration mode of the drive train, whereby for instance negatively impacting moments of reaction in the drive train can be avoided.

BRIEF DESCRIPTION OF THE DRAWINGS

Additional advantages and advantageous enhancements of the invention result from the claims and the described embodiment example which refers to the drawings.

It is shown in.

DETAILED DESCRIPTION OF THE PREFERRED EMBODIMENTS

Figure 1:
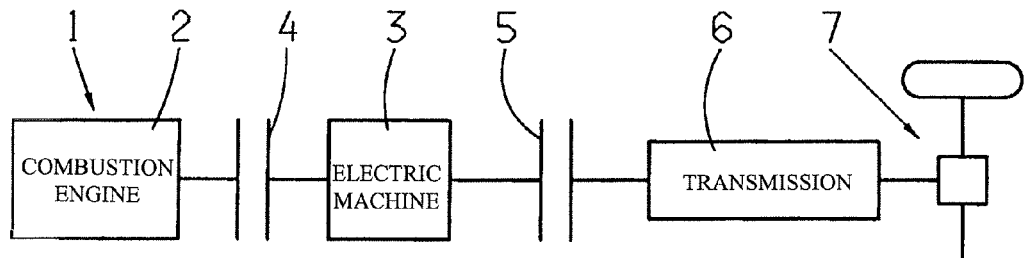
FIG. 1 a simplified presentation of a parallel-hybrid drive train of a motor vehicle.

FIG. 1 shows a parallel-hybrid drive train 1 of a vehicle with a combustion engine 2 and an electric machine 3. Between the combustion engine 2 and the electric machine 3, a clutch device 4 is positioned through which the combustion engine 2 can be separated from or coupled to the drive train 1. In reference to the combustion engine 2, the electric machine 3 has on its output side an additional clutch device 5, a transmission 6, and an output 7 of the parallel-hybrid drive train 1, whereby the additional clutch device 5, in a disengaged condition, deactivates the operating connection between the electric machine 3 and the transmission 6.

Figure 2:
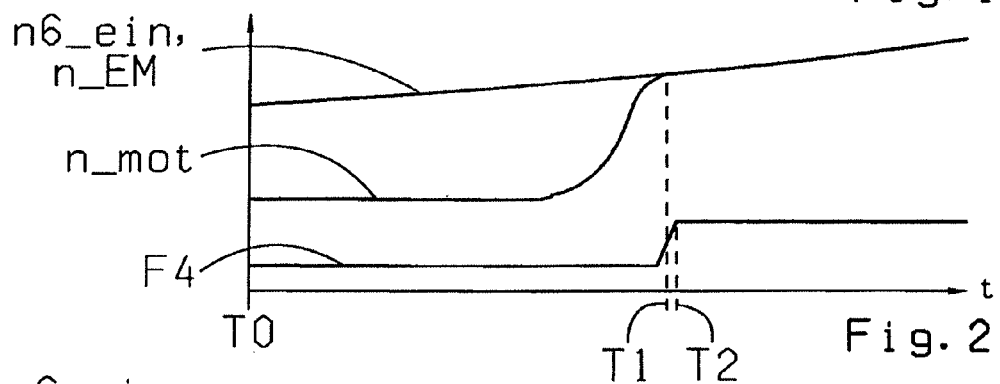
FIG. 2 different sequences of operating parameters of the parallel-hybrid drive train in accordance with FIG. 1, during a coupling procedure of the combustion engine when the request is present for a drive torque value which is lower than a torque threshold over time.
Figure 4:
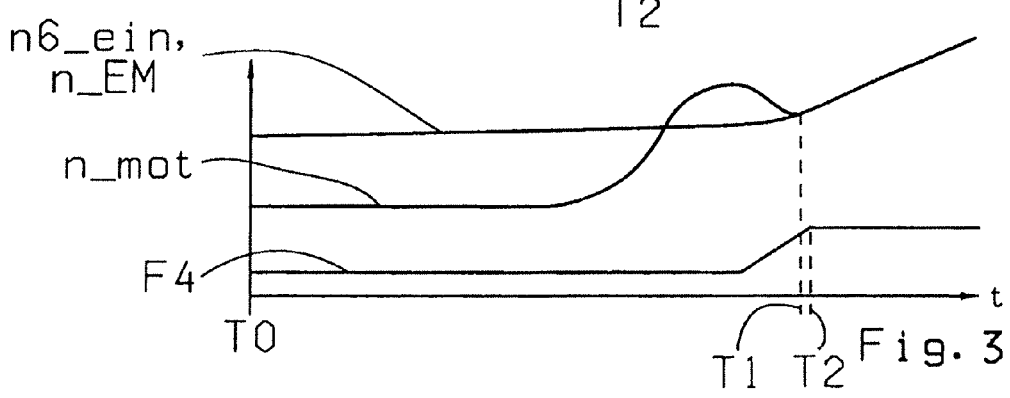
FIG. 4 a respective presentation as in FIG. 2 of the sequences of the operating condition parameters during a coupling of the combustion engine during the deceleration of the parallel-hybrid drive train.
Figure 3:
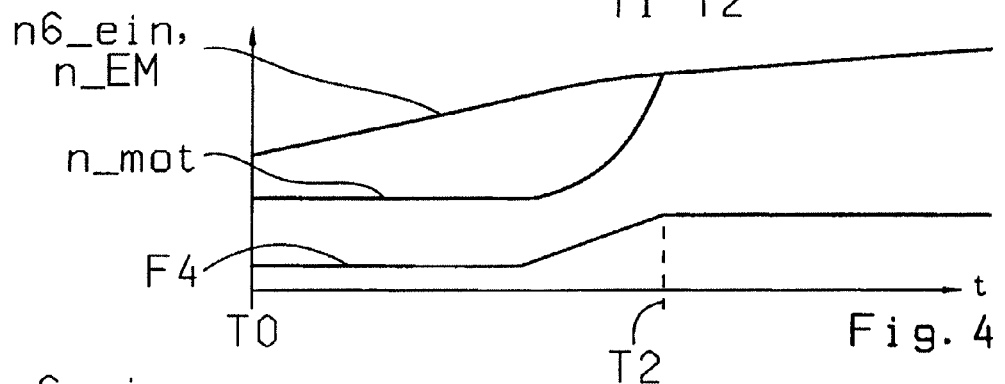
FIG. 3 a respective presentation as in FIG. 2 of the sequences of the operating condition parameters during a coupling procedure of the combustion engine when a request is present for a drive torque value which is larger than the torque threshold.

FIG. 2 to FIG. 4 each present the sequences of the operating condition parameters of the parallel-hybrid drive train 1, in accordance with FIG. 1, during different operating condition sequences over the time t, whereby the operating condition sequences in accordance with FIG. 2 and FIG. 3 each begin at least approximately from the same operational starting point of the parallel-hybrid drive train 1.

The starting point or operating point, respectively, of the parallel-hybrid drive train 1 which is the basis for the operating condition sequences in accordance with FIG. 2 and FIG. 4, are characterized by the fact that the clutch device 4 is initially in a completely disengaged operating mode and that a rotational speed $n\_mot$ of the combustion engine 2 matches approximately the idle rotational speed $n\_mot\_II$ of the combustion engine 2. Furthermore, the rotation speed of the electric machine 3 is larger than the idle rotation speed $n\_mot\_II$ of the combustion engine 2. The additional clutch device 5 is in a completely engaged operating mode, as it is during the entire following time interval which extends from the time T0, which represents the respective starting point of the patterns for the operating condition sequences, to a time T2, at which the clutch device 4 is mainly completely engaged.

Thus, the transmission input rotational speed $n6\_ein$ of the transmission device 6, during the entire time interval, matches the rotational speed $n\_EM$ of the electric machine 3. In addition, a hybrid motor vehicle which is designed with the parallel-hybrid drive train 1 in accordance with FIG. 1 during a request to couple the combustion engine 2 to the parallel-hybrid drive train 1, is here operated in a pure electric mode, whereby at the time T0 the present drive torque at the output 7 is provided just by the electric machine 3.

The request to couple the combustion engine 2 is generated, for instance, when there is a need to charge an electric storage which is assigned to the electric machine 3 or when, during the traction mode of the parallel-hybrid drive train 1, a moderate increase is required due to a requested drive torque, or, during the deceleration mode of the parallel-hybrid drive train 1 which requires an increase of the deceleration torque at the output 7 and the coupling of the combustion engine 2 to the drive train 1, respectively.

At the time T0, the parallel-hybrid drive train 1 is at its starting point, whereby the rotation speed $n\_mot$ of the combustion engine 2, during the traction mode of the parallel-hybrid drive train 1 and when a request is present to couple the combustion engine 2, as well as the presence of a drive torque value which is lower than the torque threshold, and simultaneously with clutch device 4 completely disengaged, is brought to the rotational speed $n\_EM$ of the electric machine 3 as further presented in the method and manner of FIG. 2. The combustion engine 2 is controlled such that its rotational speed or torque is elevated or accelerated, respectively, to the transmission input rotational speed n6_ein or the rotational speed n_EM of the electric machine 3.

The clutch device 4 at the time T1 at least approximately reaches its synchronous operating mode, is engaged nearly load free once the synchronous condition has been determined by increasing the activation force F4, and is completely engaged at the time T2. Thereafter, the torque of the combustion engine 2 is increased to provide the required torque value.

Based on the previously described operating mode of the drive train 1 at the time T0, the combustion engine 2 is coupled to the drive train 1 in the presented method and manner as in FIG. 3, if a drive torque value is requested which is larger than the torque threshold and when the requested torque exceeds the maximum drive torque of the electric machine 3 during the traction mode of the drive train 1. At this time, a spontaneous coupling of the combustion engine 2 with the drive train 1 for a power increase is imperatively necessary.

Dependent on each case in the present application, the combustion engine 2 is controlled in its rotation speed, torque limited, or free wheeling to a rotation speed value above the rotation speed n_EM of the electric machine 3, and the clutch device 4 is slippingly engaged when reaching the rotation speed value through a ramp increase of the activation force F4. Due to the slipping operation of the clutch device 4 and for the increase of the present drive torque at the parallel-hybrid drive train 1, the centrifugal mass of the rotating combustion engine 2 is applied, meaning the static motor torque as well as the dynamic content. Since the combustion engine 2 is already at a higher rotation speed level during the coupling time in comparison to the previously described method, and also in comparison to conventionally operated parallel-hybrid drive trains, a larger torque can be generated as compared to conventionally operated drive trains in hybrid motor vehicles at the time of coupling with the combustion engine 2.

Thus, the rotation speed n_mot of the combustion engine 2, when a request is present for a drive torque value which is larger than the torque threshold, is brought to a rotational speed value above the rotational speed n_EM of the electric machine and the coupling device 4 is slippingly engaged when the rotational speed value has been reached. At the time T2, when the clutch device 4 has its engagement force applied, the clutch device 4 is completely engaged.

During the sequences of the operating condition parameters of the hybrid drive train 1 in accordance with FIG. 4 and its operating mode sequence, the parallel-hybrid drive train 1 is operating in the deceleration mode and the clutch device 4 is disengaged at the time T0, while the rotational speed n_mot of the combustion engine 2 matches the idle rotational speed n_mot_II and the rotational speed n_EM of the electric machine 3, which matches the transmission input rotational speed n6_ein with the additional transmission device 5 engaged, and is larger than the idling rotational speed n_mot_II.

To present a deceleration torque at the output 7 of the parallel-hybrid drive train 1 which cannot be generated by the electric machine 3 alone, a request to couple the combustion engine 2 is issued and the combustion engine 2 is brought into the deceleration cancellation, or further operated in it. The clutch device 4 is, dependent on its ability to transfer torque, or applicable torque, respectively, engaged in slippage mode. The rotational speed n_mot of the combustion engine 2 is brought, during the engagement operation of the clutch device 4, in the method and manner as presented in FIG. 4 and dependent of the transfer ability of the clutch device 4, to the level of the rotational speed n_EM of the electric machine 3, or the transmission input rotational speed n6_ein. Hereby, the combustion engine 2 does not use fuel when the deceleration mode is canceled and the deceleration torque which is present at the output 7 can be created as required when the combustion engine 2 is coupled.

The transfer ability of the clutch device 4 is controllably adjusted during the engagement procedure in a way that the rotational speed of the combustion engine, on one hand, does not present an erratic increase and the drive rotational speed, on the other hand, does not present a reduction or decrease of the drive comfort.

In addition, it is also provided that a change of the basic conditions, especially in regard to the respective, required torque, as well as a change between the deceleration mode and the traction mode of the parallel-hybrid drive train 1, and during the sequences as further explained in FIG. 2 to FIG. 4 and the functions of the method, a seamless transition between the three partial functions is applied, through which an optimum procedure which matches the drive situation is guaranteed.

REFERENCE CHARACTERS

1 Parallel-Hybrid-Drive Train
2 Combustion Engine
3 Electric Machine
4 Clutch Device
5 Additional Clutch Device
6 Transmission Device
7 Output
F4 Activating Force of the Clutch Device
n_EM rpm of the Electric Machine
n_mot rpm of the Combustion Engine
n6_ein Transmission Input rpm
t Time
T0 to T2 discrete time point

The invention claimed is:

1. A method of coupling an internal combustion engine (2) of a parallel-hybrid drive train (1) via a clutch device (4) positioned between the combustion engine (2) and an electric machine (3), starting with a disengaged operating condition of the clutch device (4), a rotational speed (n_mot) of the combustion engine (2) which matches at least approximately an idle rotation speed (n_mot II), and a rotational speed (n_EM) of the electric machine (3) that is larger than the idle rotational speed (n_mot_II) of the combustion engine (2), whereby in a traction mode of the drive train (1) and in a presence of a request to couple the combustion engine (2) as well as when a drive torque value is lower than a torque threshold, the rotational speed (n_mot) of the combustion engine (2) is brought up to the rotational speed (n_EM) of the electric machine (3) and the clutch device (4) is at least approximately engaged in a synchronous operating mode, and whereby the torque of the combustion engine (2) is increased thereafter, the method comprising the steps of:

in a presence of a request for a drive torque value which is larger than the torque threshold, increasing the rotation speed (n_mot) of the combustion engine (2) to a rotational speed value which is greater than the rotation speed (n_EM) of the electric machine (3);

once the rotational speed value is reached, slippingly engaging the clutch device (4) while the combustion engine (2) is brought into a deceleration cancellation when in a deceleration operation of the drive train (1) and when there is the presence of a request to couple the combustion engine (2); and adjusting the rotational speed (n_mot) of the combustion engine (2), during the engagement procedure of the clutch device (4), to the rotation speed (n_EM) of the electric machine (3) dependent of a transfer ability of the clutch device (4).

2. The method according to claim 1, further comprising the step of, when a request is present for the coupling of the combustion engine (2) and the drive torque value is larger than the torque threshold, controllably adjusting the rotation speed (n_mot) of the combustion engine (2).

3. The method according to claim 1, further comprising the step of, when a request is present for the coupling of the combustion engine (2) and the drive torque value is larger than the torque threshold, limiting the drive torque of the combustion engine (2) by a predefined torque value while increasing the rotational speed (n_mot) of the combustion engine (2).

4. The method according to claim 1, further comprising the step of, during a change of the request for the drive torque, varying the activation of the clutch device (4).

5. The method according to claim 1, further comprising the step of, during a change between a traction mode and a deceleration mode of the parallel-hybrid drive train (1), varying the activation of the clutch device (4).

* * * * *